United States Patent [19]
Fukaya et al.

[11] Patent Number: 5,683,160
[45] Date of Patent: Nov. 4, 1997

[54] OVERHEAD PROJECTOR WITH HIGH ILLUMINANCE LAMP AS LIGHT SOURCE

[75] Inventors: Mamoru Fukaya; Mutsuo Kai; Tatsuo Kinoshita, all of Nagoya, Japan

[73] Assignee: Elmo Co., Ltd., Nagoya, Japan

[21] Appl. No.: 717,814

[22] Filed: Sep. 24, 1996

[51] Int. Cl.⁶ .................................................. G03B 21/16
[52] U.S. Cl. .................... 353/57; 353/61; 353/DIG. 3
[58] Field of Search .................................. 353/57, 60, 61, 353/DIG. 3, 119

[56] References Cited

U.S. PATENT DOCUMENTS

| | | | |
|---|---|---|---|
| 3,619,048 | 11/1971 | Engert et al. | 353/60 |
| 3,711,194 | 1/1973 | Wilson, Jr. | 353/61 |
| 4,880,303 | 11/1989 | Grunwald | 353/DIG. 3 |
| 4,882,599 | 11/1989 | Grunwald | 353/60 |
| 4,904,079 | 2/1990 | Yoshimura et al. | 353/60 |

*Primary Examiner*—William Dowling
*Attorney, Agent, or Firm*—Koda and Androlia

[57] ABSTRACT

An overhead projector includes a housing including a stage which is formed in its top wall and on which a transparency bearing an image to be projected is placed and an air outlet formed in one of its two side walls, an exhaust fan incorporated in the housing for exhausting air in the housing through the air outlet of the housing, a projection light source such as a high illuminance halogen lamp disposed in the housing for illuminating the transparency on the stage from inside the housing, a projection head mounted for projecting a magnified image from the transparency on a screen and including a focusing lens and a reflecting mirror, a column mounted on the housing to hold the projection head over the stage, a Fresnel lens disposed inside the stage to converge light from the light source on the focusing lens of the projection head, a cooling fan, and air guides for guiding air delivered from the cooling fan so that the air flows along a surface of the stage.

2 Claims, 3 Drawing Sheets

OVERHEAD PROJECTOR WITH HIGH ILLUMINANCE LAMP AS LIGHT SOURCE

BACKGROUND OF THE INVENTION

1. Field of the Invention

The present invention relates to overhead projectors, and more particularly to overhead projectors of the transmissive type employing a high illuminance lamp as a light source.

2. Description of the Prior Art

Generally, an overhead projector comprises a box-like housing having a stage which is formed in a top wall thereof and on which a transparency bearing an image to be projected is placed and an air outlet formed in a side wall thereof. An exhaust fan is incorporated in the housing for exhausting air inside the housing through the air outlet. A projection light source is also provided in the housing for illuminating the transparency placed on the stage. A projection head is provided for projecting a magnified image on the transparency onto a remote viewing surface such as a screen and includes a focusing lens and a reflecting mirror for focusing and directing the image from the transparency to the screen. A column stands up from the housing to hold the projection head over the stage. A Fresnel lens is disposed inside the stage for converging light from the light source on the projection lens.

The overhead projector of the above-described type recently employs a high illuminance lamp, for example, a halogen lamp, as the light source so that the visibility of the enlarged image projected on the screen can be improved. In this case, however, the transparency placed on the stage would be subjected to high energy heat rays produced by the high illuminance lamp such that the transparency may be deformed. Means need to be provided for preventing deformation of the transparency due to heat.

In the conventional overhead projectors of the transmissive type, air heated by the heat rays from the light source is exhausted by the exhaust fan out of the housing. Furthermore, a cold mirror which reflects light energy but few heat rays is employed as a spherical reflecting mirror mounted in the rear of or below the lamp. Moreover, a heat ray reflecting filter is interposed between the lamp and the Fresnel lens.

Films such as color copied films or X-ray films are frequently used as a transparency in the above-described overhead projectors. However, materials for these films themselves are easily heat deformed. Furthermore, dark colored portions of a projected area of these films absorb heat rays. Consequently, the above-described conventional means cannot provide sufficient prevention of heat deformation of the transparency and accordingly, use of the high illuminance lamp is limited.

SUMMARY OF THE INVENTION

Therefore, an object of the present invention is to provide an overhead projector wherein clearer projected image can be obtained by employment of a high illuminance projection lamp and the transparency can be prevented from deformation due to heat.

To achieve the object, the present invention provides an overhead projector comprising a housing including a stage which is formed on a top wall thereof and on which a transparency bearing an image to be projected is placed and an air outlet formed in one of two side walls thereof. An exhaust fan is provided in the housing for exhausting air in the housing through the air outlet of the housing. A projection light source is provided in the housing for illuminating the transparency on the stage from inside the housing. A projection head is provided for projecting a magnified image from the transparency on a screen and including a focusing lens and a reflecting mirror. A column is mounted on the housing to hold the projection head over the stage. A Fresnel lens is disposed inside the stage to converge light from the light source on the focusing lens of the projection head. The overhead projector further comprises a cooling fan and air guide means. The air guide means is provided for guiding air delivered from the cooling fan so that the air flows along a surface of the stage.

According to the above-described overhead projector, the transparency is directly cooled by the air supplied by the cooling fan to flow along the surface of the stage. Consequently, the transparency can be prevented from deformation due to heat rays from the high illuminance lamp.

The cooling fan may be disposed in the housing. A vent hole and an air inlet each communicating with the inside and the outside of the housing may be formed in the other side wall of the housing. The air guide means preferably includes an outer guide member mounted outside the vent hole and an inner guide member provided in the housing. An external air may be drawn into the housing through the air inlet by the cooling fan so that the drawn air is guided by the inner guide member through the vent hole to the outer guide member and is further guided by the outer guide member to flow along the surface of the stage. Since the cooling fan is disposed in the housing, the overhead projector can be compacted.

The vent hole may be disposed opposite to a space defined between an undersurface of the stage and the Fresnel lens. The external air may be drawn in by the exhaust fan through the vent hole extending at both sides of the outer guide member. The drawn air may be exhausted through the space and the air outlet out of the housing. Since the external air drawn into the housing by the exhaust fan flows through the space between the underside of the stage and the Fresnel lens, the transparency on the stage can be cooled by the air flowing through the space. Consequently, the deformation of the transparency due to heat can reliably be prevented.

BRIEF DESCRIPTION OF THE DRAWINGS

Other objects, features and advantages of the present invention will become clear upon reviewing the following description of preferred embodiment thereof, made with reference to the accompanying drawings, in which.

DETAILED DESCRIPTION OF THE PREFERRED EMBODIMENT

Figure 1:
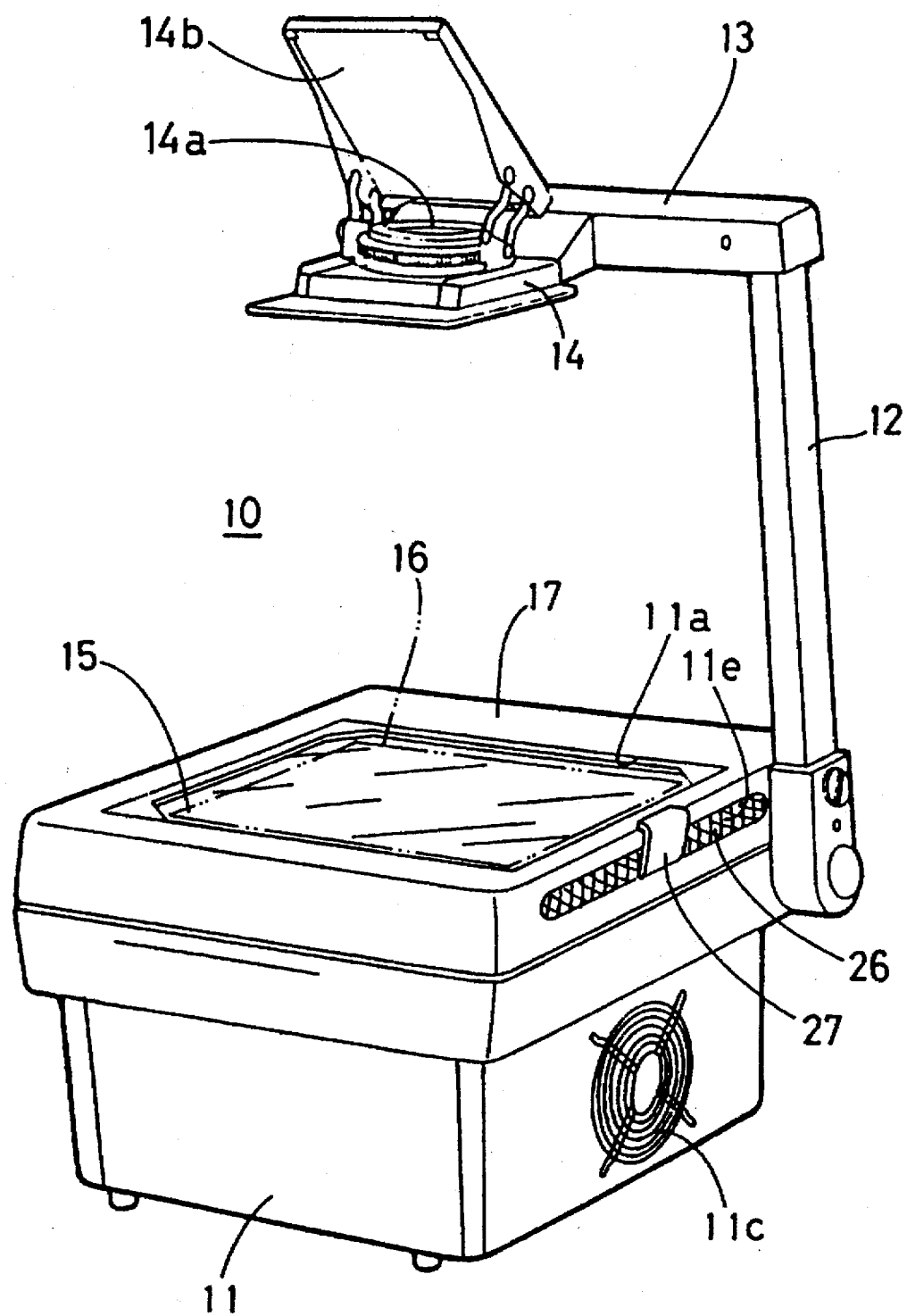
FIG. 1 is a perspective view of an overhead projector of one embodiment in accordance with the present invention.

One embodiment of the present invention will be described with reference to the accompanying drawings. Referring to FIG. 1, an overhead projector 10 in accordance with the present invention is shown. The overhead projector 10 comprises a generally box-like housing 11, a column or mast 12 standing from a rear corner of the housing 11, and a projection head 14 held on an arm 13 further mounted on an upper end of the column 12. The housing 11 has an opening 11a formed in a top wall thereof. A stage 17 includes a transparent stage glass plate 15 fitted in the opening 11a. A transparency or film 16 bearing an image to be projected is placed on the stage 17. The housing 11 further has a circular air inlet 11c and a slender vent hole 11e each formed in a right side face thereof. A wire mesh 26 is fitted in the vent hole 11e, and an outer guide member 27 which will be described later is mounted on the central portion of the wire mesh 26. The projection head 14 includes a focusing lens 14a and a reflecting mirror 14b.

Figure 2:
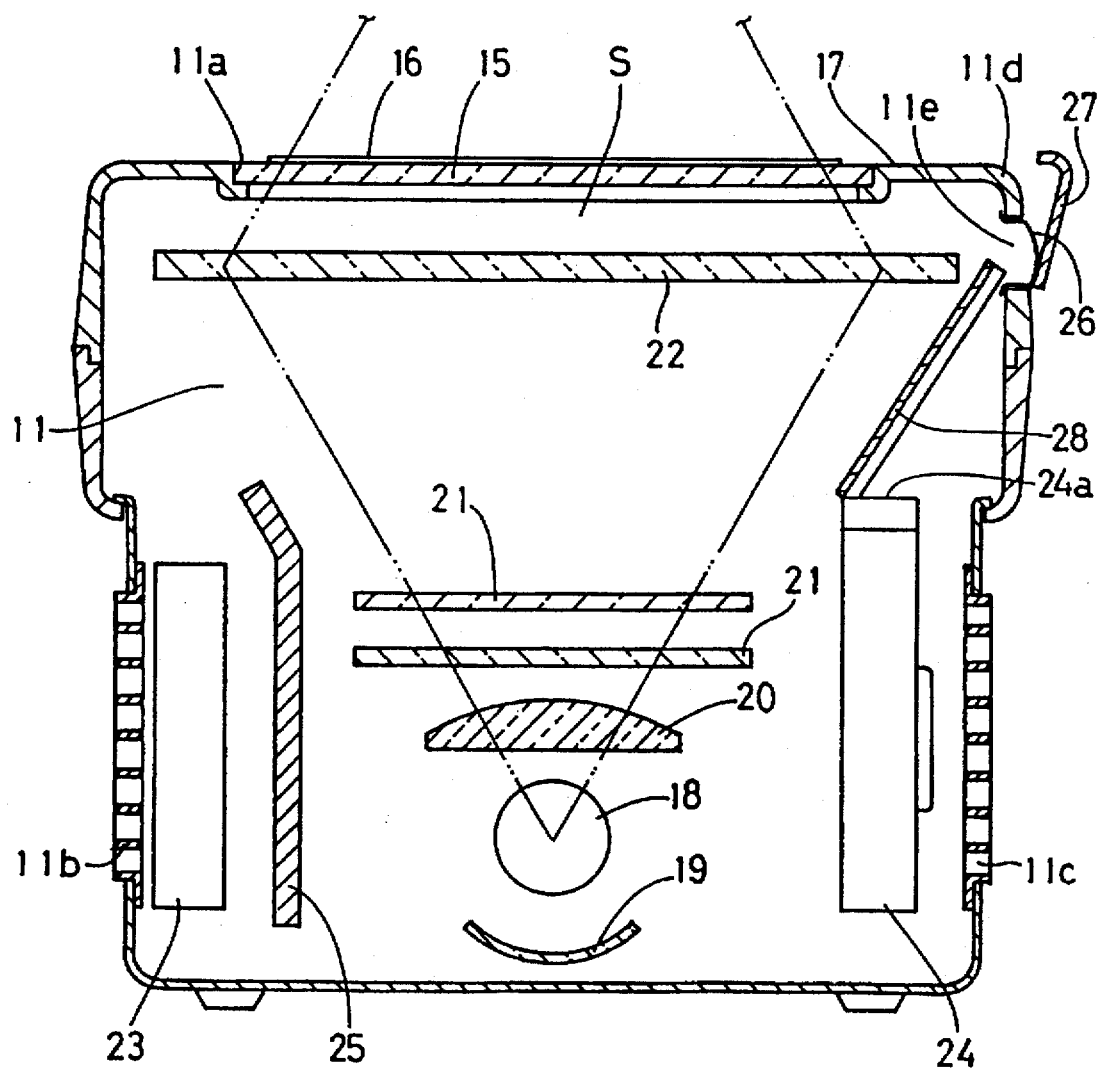
FIG. 2 is a schematic longitudinal section of the overhead projector.

Referring now to FIG. 2, a high illuminance halogen lamp 18 is provided in the housing 11. A spherical reflecting mirror 19 is disposed below the halogen lamp 18 for reflecting light from the halogen lamp 18 toward the stage 17. A condenser lens 20 is disposed over the halogen lamp 18 for converging the light from the halogen lamp 18 on the stage glass 15. Two heat ray reflecting filters 21 are disposed over the condenser lens 20. A Fresnel lens 22 is provided below the stage 17 in the housing 11 for converging the light from the halogen lamp 18 on the projection head 14. The housing 11 has an air outlet 11b formed in a left side wall thereof. An exhaust fan 23 is provided in the vicinity of the air outlet 11b in the housing for exhausting air in the housing 11 through the air outlet 11b. A volute or scroll cooling fan 24 is provided in the vicinity of the air inlet 11c in the housing 11 for drawing in external air through the air inlet 11c. Louvers 25 are disposed between the halogen lamp 18 and the exhaust fan 23 for preventing the light from the halogen lamp 18 from leaking through the air outlet 11b.

Referring further to FIG. 2, a right-hand outer edge of the top wall of the housing 11 composing the stage 17 has a curved portion 11d having a predetermined radius of curvature. The vent hole 11e is adjacent to the curved portion 11d. The vent hole 11e is formed to be opposite to a space S defined between an undersurface of the stage glass 15 and the Fresnel lens 22. As described above, the vent hole 11e is covered by the wire mesh 26 and the outer guide member 27 is mounted on the central portion of the wire mesh 26 so as to cover a part of the vent hole 11e outside the same. More specifically, a lower end of the outer guide member 27 is secured to the wire mesh 26 by spot welding, whereas an upper end thereof is bent inwardly so that its distal end is directed to the curved portion 11d. A channel-like inner guide member 28 is provided between a discharge opening 24a of the cooling fan 24 and the vent hole 11e in the housing 11. The inner guide member 28 serves to direct air discharged from the cooling fan 24 to the outer guide member 27 through the vent hole 11e.

Figure 3:
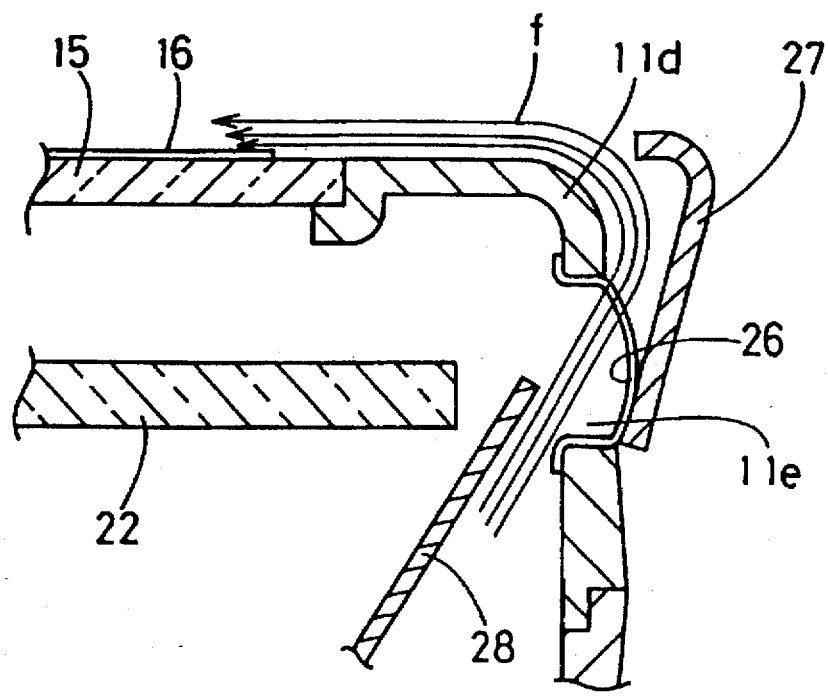
FIG. 3 is a schematic enlarged sectional view of a portion of the projector including a vent hole.
Figure 4:
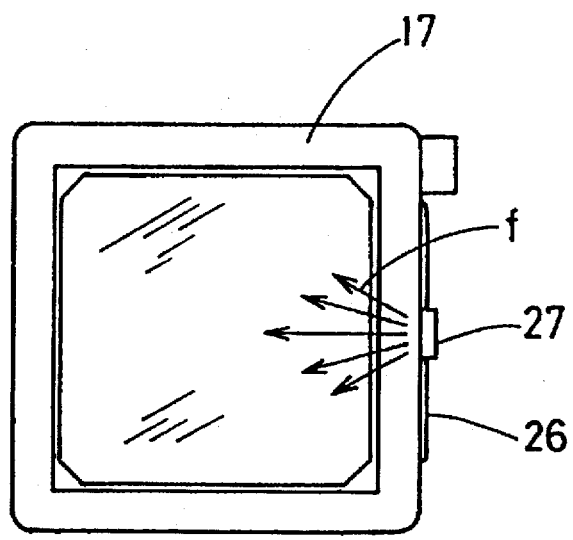
FIG. 4 is a schematic top view of the overhead projector, showing air flow on the surface of a stage.

The operation of the overhead projector 10 will now be described. The high illuminance halogen lamp 18 is turned on so that the transparency 16 placed on the stage glass 15 is illuminated. An image on the transparency 16 is magnified and projected on a screen (not shown) by the focusing lens 14a and the reflecting mirror 14b of the projection head 14. The cooling fan 24 is driven so that an external air is drawn into the housing 11 through the air inlet 11c. The drawn external air is guided by the inner guide member 28 to be delivered to the vent hole 11e and further guided by the outer guide member 27 to be directed to the curved portion 11d on the outer edge of the top wall of the housing 11. Air flows along the curved portion 11d over the outer edge of the top wall of the housing 11 as schematically shown by arrows f in FIGS. 3 and 4. Consequently, since the air flows along the surface of the stage 17, the transparency 16 placed on the stage 17 is directly exposed to the air to be cooled without floating. Furthermore, the central portion of the stage 17 is heated to a relatively high temperature, whereas the peripheral portion thereof is heated to a lower temperature. The air is dispersed over the curved portion 11d. Relatively strong air flows f are induced over the central portion of the stage 17 and weaker air flows f are induced over the peripheral portion of the stage 17. Consequently, the central and peripheral portions of the stage 17 are cooled efficiently.

Furthermore, the exhaust fan 23 is driven so that air in the housing 11 is exhausted through the air outlet 11b out of the housing. With this exhausting operation, an external air is caused to flow through the air inlet 11c and the vent hole 11e into the housing 11. Consequently, the temperature in the housing 11 can be prevented from being excessively increased by heat generated by the halogen lamp 18. Particularly, since the vent hole 11e is located opposite to the space S between the undersurface of the stage glass 15 and the Fresnel lens 22, an external air flowing through the vent hole 11e into the housing 11 further flows through the space S. Consequently, the external air flowing through the vent hole 11e into the housing 11 comes in contact with the stage glass 15, thereby cooling the transparency 16 placed thereon.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

What is claimed is:

1. An overhead projector comprising:

a housing including a stage which is formed on a top wall thereof and on which a transparency bearing an image to be projected is placed and an air outlet formed in one of two side walls thereof;

an exhaust fan provided in the housing for exhausting air in the housing through the air outlet out of the housing;

a projection light source provided in the housing for illuminating the transparency on the stage from inside the housing;

a projection head provided for projecting a magnified image from the transparency on a screen and including a focusing lens and a reflecting mirror;

a column mounted on the housing to hold the projection head over the stage;

a Fresnel lens disposed inside the stage to converge light from the light source on the focusing lens of the projection head;

a cooling fan; and air guide means for guiding air delivered from the cooling fan so that the air flows along a surface of the stage and wherein:

the cooling fan is disposed in the housing a vent hole and an air inlet each communicating with the inside and the outside of the housing are formed in the other side wall of the housing, the air guide means includes an outer guide member mounted outside the vent hole and an inner guide member provided in the housing, and an external air is drawn into the housing through the air inlet by the cooling fan so that the drawn air is guided by the inner guide member through the vent hole to the outer guide member and is further guided by the outer guide member to flow along the surface of the stage.

2. The overhead projector according to claim 1, wherein the vent hole is disposed opposite to a space defined between an undersurface of the stage and the Fresnel lens, the external air is drawn in by the exhaust fan through the vent hole extending at both sides of the outer guide member, and the drawn air is exhausted through the space and the air outlet out of the housing.

* * * * *